UNITED STATES PATENT OFFICE.

EDWARD WILLIAM PARNELL AND JAMES SIMPSON, OF LIVERPOOL, COUNTY OF LANCASTER, ENGLAND.

PROCESS OF TREATING AMMONIUM SULPHIDE TO OBTAIN HYDROGEN SULPHIDE.

SPECIFICATION forming part of Letters Patent No. 343,674, dated June 15, 1886.

Application filed October 10, 1885. Serial No. 179,522. (No specimens.) Patented in England June 13, 1885, No. 8,440; in France August 27, 1885, No. 170,868; in Belgium August 28, 1885, No. 70,044, and in Germany September 1, 1885, No. 35,232.

*To all whom it may concern:*

Be it known that we, EDWARD WILLIAM PARNELL and JAMES SIMPSON, subjects of the Queen of Great Britain, and residents of Liverpool, in the county of Lancaster, England, have invented a certain new and useful Process for Obtaining Sulphureted Hydrogen from Sulphide of Ammonium, (for which we have obtained Letters Patent of Great Britain No. 8,440, June 13, 1885, Letters Patent of Belgium No. 70,044, August 28, 1885, Letters Patent of France No. 170,868, August 27, 1885, Letters Patent of Germany No. 35,232, September 1, 1885, and applied for Letters Patent of Austria-Hungary, which are not yet granted, and nowhere else;) and we do hereby declare that the following is a full, clear, and exact description of the invention.

When the Le Blanc alkali waste or other material containing sulphide of calcium is heated with a solution of carbonate or sulphate of ammonia or chloride of ammonium decomposition takes place, the acid or chloride combining with the calcium, while the sulphur combines with the ammonia, forming sulphide of ammonium. This sulphide of ammonium is not entirely given off in the combined form, the vapors which are first evolved containing an excess of sulphureted hydrogen, while ammonia predominates at the final stage.

The object of our invention is to treat the sulphide of ammonia obtained as above set forth so as to liberate the sulphur it contains in combination with hydrogen in a form available for the manufacture of sulphur and its compounds, and to leave the ammonia in the form of carbonate.

The invention consists, essentially, in obtaining the sulphureted hydrogen from the sulphide of ammonium by treating the sulphide of ammonium with sesquicarbonate of ammonium under the action of heat or of a partial vacuum, a reaction ensuing, in which monocarbonate of ammonium is formed in solution and sulphureted hydrogen is evolved. A further stage of the process consists in reconverting the said monocarbonate of ammonium into sesquicarbonate by passing a current of carbonic-acid gas through it, and the sesquicarbonate so obtained may be again used to liberate sulphureted hydrogen from sulphide of ammonium, or it may be passed into the absorbing plant used in the ammonia-alkali process, or is otherwise employed.

When the monocarbonate of ammonium which results from the treatment of sulphide of ammonium with sesquicarbonate of ammonium is used for the treatment of sulphide of calcium, the sesquicarbonate of ammonium used for decomposing the sulphide of ammonium may be very dilute and entirely in solution; but when the monocarbonate of ammonium is required in the ammonia-alkali process it is necessary that the sesquicarbonate of ammonium should be in a concentrated form. The sulphureted hydrogen is cooled in a suitable condenser, and is washed in a solution of ammonium sulphide or sulphydrate to remove sulphide of ammonium, ammonia, and carbonic acid, and then is conducted to a gasometer or other receptacle.

The treatment of monocarbonate by carbonic-acid gas to form sesquicarbonate may be continued beyond the stage of producing sesquicarbonate, and the bicarbonate or other carbonates produced may be used in place of the sesquicarbonate, but not so advantageously. During carbonating the escaping gases should be washed in acid, to arrest any traces of ammonia.

We find that two equivalents of sesquicarbonate of ammonium to one equivalent of sulphide of ammonium are about the relative proportions in which the decomposition of the sulphide and liberation of sulphureted hydrogen can be efficiently conducted; but we prefer to have a slight excess of sesquicarbonate over these proportions.

We wish it to be understood that in referring to solutions as consisting of sulphide, monocarbonate, sesquicarbonate, or bicarbonate of ammonium, we do not mean that they consist exclusively of these salts or compounds, but that the salt or compound indicated predominates largely in such solution.

No claim is made herein to the use of fixed alkaline carbonates.

We claim—

1. The herein-described process of obtaining sulphureted hydrogen from sulphide of ammonium, consisting in treating the sulphide of ammonium with sesquicarbonate of ammonium, substantially in the manner set forth.

2. The herein-described process of obtaining sulphureted hydrogen from sulphide of ammonium, consisting in subjecting a mixture of sulphide of ammonium and sesquicarbonate of ammonium in solution to the action of heat, substantially as set forth.

E. W. PARNELL.
JAMES SIMPSON.

Witnesses:
JOHN MORROW,
 8ª Rumford Place, Liverpool, Merchant.
E. J. CAPE,
 8ª Rumford Place, Liverpool, Bookkeeper.